United States Patent
Yamazaki et al.

(10) Patent No.: US 10,994,721 B2
(45) Date of Patent: May 4, 2021

(54) ENGINE AND MOTOR CONTROL DURING WHEEL TORQUE REVERSAL IN A HYBRID VEHICLE

(71) Applicant: Ford Global Technologies, LLC, Dearborn, MI (US)

(72) Inventors: Mark Steven Yamazaki, Canton, MI (US); Jason Meyer, Canton, MI (US); Jeffrey Allen Doering, Canton, MI (US); Bernard D. Nefcy, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 642 days.

(21) Appl. No.: 15/263,529

(22) Filed: Sep. 13, 2016

(65) Prior Publication Data

US 2018/0072306 A1    Mar. 15, 2018

(51) Int. Cl.
*B60W 20/15* (2016.01)
*B60K 6/387* (2007.10)
(Continued)

(52) U.S. Cl.
CPC ............. *B60W 20/15* (2016.01); *B60K 6/387* (2013.01); *B60K 6/48* (2013.01); *B60K 6/54* (2013.01); *B60K 6/547* (2013.01); *B60W 10/06* (2013.01); *B60W 10/08* (2013.01); *B60W 30/20* (2013.01); *B60K 6/46* (2013.01); *B60K 2006/4825* (2013.01); *B60W 2030/206* (2013.01); *B60W 2510/0657* (2013.01); *B60W 2510/081* (2013.01); *B60W 2510/083* (2013.01); *B60W 2510/104* (2013.01); *B60W 2510/1005* (2013.01); *B60W 2510/1015* (2013.01); *B60W 2510/1025* (2013.01); *B60W 2520/28* (2013.01); *B60W 2540/10* (2013.01); (Continued)

(58) Field of Classification Search
CPC ...... B60W 20/15; B60W 10/06; B60W 10/08; B60W 30/20; B60W 2030/206; B60W 2510/0657; B60W 2510/081; B60W 2510/083; B60W 2510/1015; B60W 2510/104; B60W 2520/28; B60W 2540/10; B60W 2710/081; B60K 6/547; B60K 6/46; B60Y 2200/92; B60Y 2300/18033; B60Y 2300/20; B60Y 2300/43; B60Y 2300/60; B60Y 2400/426; B60Y 2400/70; Y10S 903/919; Y10S 903/93

See application file for complete search history.

(56) References Cited

U.S. PATENT DOCUMENTS 6,196,345 B1    3/2001  Lyons
6,319,168 B1 *  11/2001 Morris ................. B60W 10/08
                                                  477/5

(Continued)

*Primary Examiner* — Nicholas Kiswanto
(74) *Attorney, Agent, or Firm* — David B Kelley; Brooks Kushman P.C.

(57) ABSTRACT

A system and method for controlling a hybrid vehicle having an engine selectively coupled by an upstream clutch to an electric machine, which is selectively coupled by a downstream clutch to a step-ratio transmission, include at least one controller programmed to control the engine and the electric machine in response to entering a lash zone in anticipation of a wheel torque reversal to adjust a gain applied to an active motor damping torque controller to reduce driveline oscillations and backlash.

18 Claims, 7 Drawing Sheets

(51) Int. Cl.
  *B60K 6/54* (2007.10)
  *B60K 6/48* (2007.10)
  *B60K 6/547* (2007.10)
  *B60W 10/06* (2006.01)
  *B60W 10/08* (2006.01)
  *B60W 30/20* (2006.01)
  *B60K 6/46* (2007.10)

(52) U.S. Cl.
  CPC . *B60W 2710/081* (2013.01); *B60W 2710/083* (2013.01); *B60Y 2200/92* (2013.01); *B60Y 2300/18033* (2013.01); *B60Y 2300/20* (2013.01); *B60Y 2300/43* (2013.01); *B60Y 2300/60* (2013.01); *B60Y 2400/426* (2013.01); *B60Y 2400/70* (2013.01); *Y02T 10/62* (2013.01); *Y10S 903/919* (2013.01); *Y10S 903/93* (2013.01)

(56) References Cited

U.S. PATENT DOCUMENTS

| | | |
|---|---|---|
| 7,024,290 B2 | 4/2006 | Zhao |
| 7,223,203 B2 | 5/2007 | Yamazaki et al. |
| 7,292,917 B2 | 11/2007 | Kuang |
| 7,577,507 B2 * | 8/2009 | Morris .................. B60W 20/11 701/51 |
| 8,463,476 B2 | 6/2013 | Ebuchi et al. |
| 8,538,643 B1 | 9/2013 | Wang et al. |
| 8,954,215 B2 | 2/2015 | Yamazaki et al. |
| 8,996,220 B2 | 3/2015 | Ohno et al. |
| 9,008,941 B2 | 4/2015 | Park et al. |
| 9,037,329 B2 | 5/2015 | Nefcy et al. |
| 9,327,715 B2 * | 5/2016 | Tanishima ............ B60W 10/10 |
| 2011/0053733 A1 | 3/2011 | Swales et al. |
| 2012/0262102 A1 | 10/2012 | Gee |
| 2014/0257617 A1 | 9/2014 | Klymenko et al. |
| 2015/0191089 A1 | 7/2015 | Yamamoto et al. |

* cited by examiner

ENGINE AND MOTOR CONTROL DURING WHEEL TORQUE REVERSAL IN A HYBRID VEHICLE

TECHNICAL FIELD

This disclosure relates to controlling a hybrid vehicle during wheel torque reversal.

BACKGROUND

Vehicles may experience powertrain oscillations that disrupt smooth operation and lead to objectionable drivability if not properly controlled. In hybrid electric vehicles (HEVs), it is often desirable to move from a propulsive force on the wheels to a regenerative braking force on the wheels very quickly. Similarly, the vehicle may transition from a large regenerative force to a propulsive force if the driver steps into the accelerator. Driveline lash or backlash may occur due to lost motion caused by slack or clearance within or between various driveline components associated with transmission gearing, a transaxle, driveline joints, wheels, etc. when torque changes direction. When transitioning from propulsive force to regenerative force or vice versa, the driveline will cross a zero torque point where meshing gear teeth or otherwise coupled components are floating or not touching. This may trigger driveline clunk and oscillation if this region, sometimes referred to as the lash zone, is traversed too quickly.

SUMMARY

In various embodiments, a system and method for controlling a hybrid vehicle having an engine selectively coupled by an upstream clutch to an electric machine, which is selectively coupled by a downstream clutch to a step-ratio transmission, include at least one controller programmed to control the engine and the electric machine in response to entering a lash zone in anticipation of a wheel torque reversal to adjust a gain applied to an active motor damping torque controller to reduce driveline oscillations and backlash.

Embodiments may include a method for controlling a vehicle having an engine, an electric machine, and a transmission that includes, in response to: a change in driver demanded torque; and input torque to the transmission approaching zero, adjusting at least one gain of an electric machine torque feedback controller to control torque of the electric machine through a lash region associated with a driveline or wheel torque reversal. Adjusting at least one gain may include reducing the at least one gain to near zero. Adjusting at least one gain may be performed in response to a torque ratio of the transmission being within a specified range.

DETAILED DESCRIPTION

As required, detailed embodiments are disclosed herein; however, it is to be understood that the disclosed embodiments are merely representative and may be embodied in various and alternative forms. The figures are not necessarily to scale; some features may be exaggerated or minimized to show details of particular components. Therefore, specific structural and functional details disclosed are not to be interpreted as limiting, but merely as a representative basis for teaching one skilled in the art to variously employ the claimed subject matter.

Figure 1:
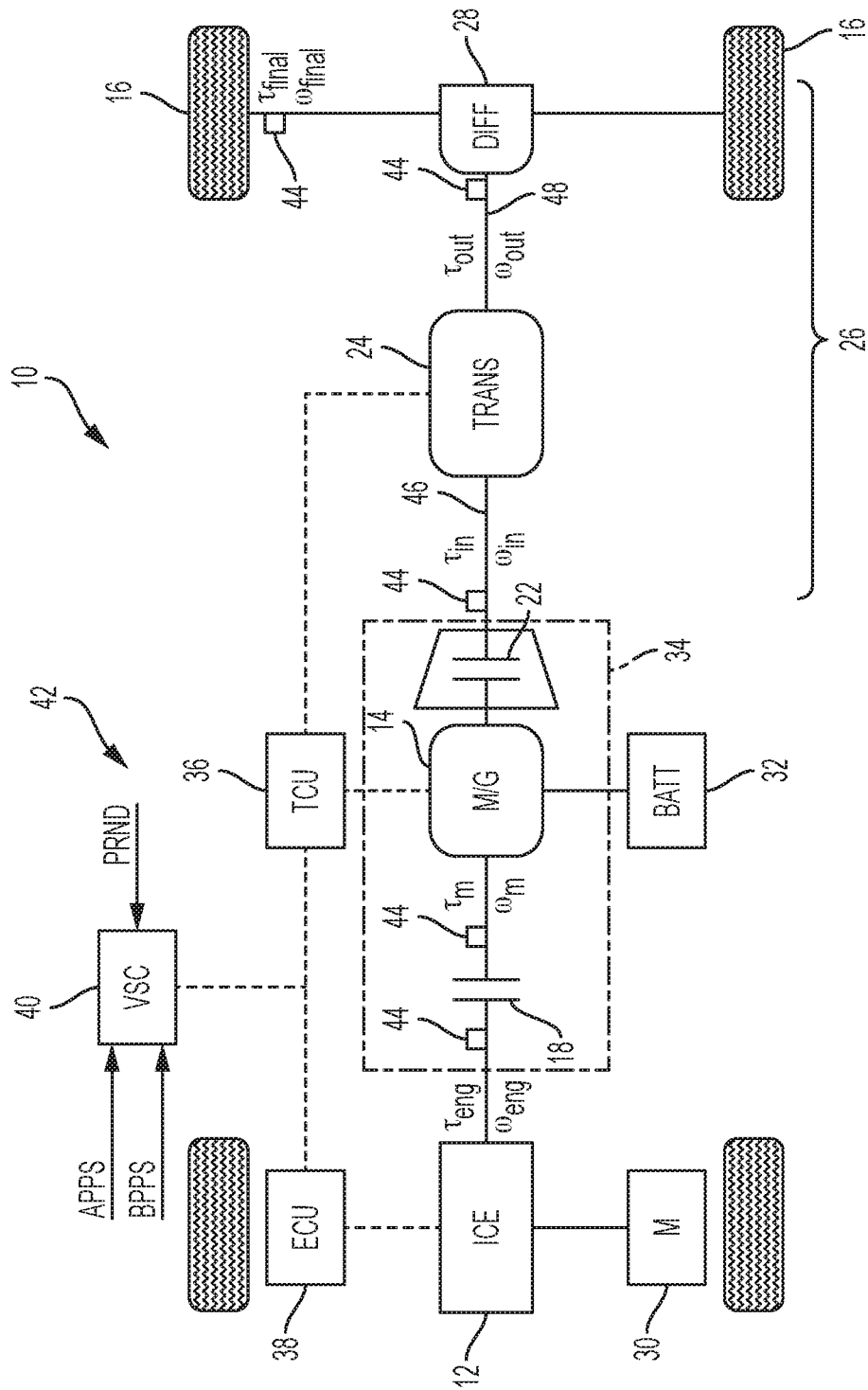
FIG. 1 is a block diagram illustrating a representative hybrid vehicle with engine and motor control associated with wheel torque reversal according to embodiments of the disclosure.

FIG. 1 illustrates a schematic diagram of a hybrid vehicle 10 of one or more embodiments. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12 or to the vehicle wheels 16.

The M/G 14 is connected to the engine 12 using a first clutch 18, also known as a disconnect clutch or the upstream clutch. A second clutch 22, also known as a launch clutch or the downstream clutch, connects the M/G 14 to a transmission 24, and all of the input torque to the transmission 24 flows through the launch clutch 22. Although the clutches 18, 22 are described and illustrated as hydraulic clutches, other types of clutches, such as electromechanical clutches may also be used. The clutches 18, 22 may be wet clutches or dry clutches. Alternatively, the clutch 22 may be replaced with a torque converter having a bypass clutch, as described further below. In different embodiments, the downstream clutch 22 refers to various coupling devices for the vehicle 10 including a traditional clutch, and a torque converter having a bypass (lock-out) clutch. This configuration may use an otherwise conventional automatic step-ratio transmission with a torque converter and is sometimes referred to as a modular hybrid transmission configuration. Various other configurations may also be suitable for the disclosed engine and motor control although not specifically illustrated or described.

The engine 12 output shaft is connected to the disconnect clutch 18, which in turn is connected to the input shaft for the M/G 14. The M/G 14 output shaft is connected to the launch clutch 22, which in turn is connected to the transmission 24. The various components of the vehicle 10 are positioned sequentially or in series with one another. The launch clutch 22 connects the vehicle prime movers to the driveline 26, which includes the transmission 24, differential 28, and vehicle wheels 16, and their interconnecting components.

In another embodiment of the vehicle 10, the downstream clutch 22 is a bypass clutch with a torque converter. The input from the M/G 14 is the impeller side of the torque converter, and the output from the torque converter to the transmission 24 is the turbine side. The torque converter transfers torque using a fluid coupling, and torque multiplication may occur depending on the amount of slip between the impeller and turbine sides. The bypass or lock-up clutch for the torque converter may be selectively engaged to create a mechanical or frictional connection between the impeller side and the turbine side for direct torque transfer. The bypass clutch may be slipped and/or opened to control the amount of torque transferred through the torque converter. The torque converter may also include a mechanical lockup clutch.

In the vehicle 10, the launch clutch 22 or bypass clutch for the torque converter may be locked to increase fuel efficiency, and may be locked when approaching or crossing a wheel torque reversal or a lash zone during depending on the particular application and implementation. The driveability and control of the effect of lash crossing within the driveline depends on the control of the powertrain torque from the engine 12 and/or the electric machine 14. M/G 14 torque may be controlled to a greater accuracy and with a faster response time than torque from engine 12. During an electric-only mode of operation for the vehicle 10, the M/G 14 torque may be controlled when crossing a lash zone. During a hybrid mode of operation of the vehicle with both the engine 12 and M/G 14 operating, the torque from M/G 14 and torque from engine 12 may be controlled together to improve driveability of the vehicle 10 and reduce the effect of lash zone crossing on driveline oscillations and the potential for driveline clunk.

In the representative embodiment illustrated, the engine 12 is a direct injection engine. Alternatively, the engine 12 may be another type of engine or prime mover, such as a port injection engine or fuel cell, or use various fuel sources, such as diesel, biofuel, natural gas, hydrogen, or the like. In some embodiments, the vehicle 10 also includes a starter motor 30 operatively connected to the engine 12, for example, through a belt or gear drive. The starter motor 30 may be used to provide torque to start the engine 12 without the addition of torque from the M/G 14, such as for a cold start or some high speed starting events.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. The M/G 14 may also be placed in a generator configuration to moderate the amount of engine 12 torque provided to the driveline 26. In one example the battery 32 is configured to connect to an external electric grid, such as for a plug-in hybrid electric vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter connected to the battery 32.

In some embodiments, the transmission 24 is an automatic transmission and connected to the drive wheels 16 in a conventional manner, and may include a differential 28. The transmission 24 may be a geared transmission, and may be a step-ratio transmission or a continuously variable transmission. The vehicle 10 is also provided with a pair of non-driven wheels, however, in alternative embodiments, a transfer case and a second differential can be utilized to positively drive all of the vehicle wheels.

The M/G 14 and the clutches 18, 22 may be located within a motor generator case 34, which may be incorporated into the transmission 24 case, or alternatively, is a separate case within the vehicle 10. The transmission 24 has a gear box to provide various gearing ratios for the vehicle 10. The transmission 24 gearbox may include clutches and planetary gearsets, or other arrangements of clutches and gear trains as are known in the art. In alternative embodiments, the transmission 24 is a continuously variable transmission or automated mechanical transmission. The transmission 24 may be an automatic six speed transmission, other speed automatic transmission, or other gearbox as is known in the art.

The transmission 24 is controlled using a transmission control unit (TCU) 36 or the like to operate on a shift schedule, such as a production shift schedule, that connects and disconnects elements within the gear box to control the gear ratio between the transmission output and transmission input. The TCU 36 also acts to control the M/G 14, the clutches 18, 22, and any other components within the motor generator case 34.

An engine control unit (ECU) 38 is configured to control the operation of the engine 12. A vehicle system controller (VSC) 40 transfers data between the TCU 36 and ECU 38 and is also in communication with various vehicle sensors either directly and/or via a vehicle network. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator assembly 34, the starter motor 30 and the engine 12 under any of a number of different conditions, including in a way that minimizes or reduces the effect of lash crossing in the driveline 26 and impact on the driver during tip in or tip out events.

The VSC 40 receives signals indicative of driver demand. An accelerator pedal position sensor (APPS) is in communication with the VSC 40, and provides information related to the accelerator pedal position, or tip-in and tip-out of the accelerator pedal. Tip-in may be used in relation to a request from the driver for more speed, power, and/or torque, while tip-out may be used in relation to a request from the driver for less speed, power, and/or torque. The brake pedal position sensor (BPPS) and gear selection (PRND) are also in communication with the VSC 40 to provide information related to driver demand. Various other sensors may be provided in some applications, such as an engine torque sensor or a transmission input torque sensor, for example. Alternatively, various operating parameters, such as engine torque or transmission input torque, may be calculated or otherwise indirectly determined by TCU 36, ECU 38, and/or VSC 40 based on inputs from other sensors and calculated or estimated parameters.

Under normal powertrain conditions (no subsystems/components faulted), the VSC 40 interprets the driver's demands (e.g. PRND and acceleration or deceleration demand), and then determines the wheel torque command based on the driver demand and powertrain limits. In addition, the VSC 40 determines when and how much torque each power source needs to provide to meet the driver's torque demand and to achieve the operating points (torque and speed) of the engine 12 and M/G 14.

The vehicle 10 may have speed sensors 44 positioned at various locations of the powertrain and driveline 26. The speed sensors 44 provide information to the control system 42 regarding the rotational speed of a shaft in approximately real time, although there may be some lag due to response time, and signal and data processing. In the embodiment shown in FIG. 1, speed sensor 44 measures the speed of the engine 12 output shaft, the speed of the shaft connected to the M/G 14, the speed of the transmission 24 input shaft, the speed of the transmission 24 output shaft, and the speed of one or both of the axles connected to the wheels 16.

As a part of the control strategy or algorithm for operation of the vehicle 10, the control system 42 may make an engine torque request ($\tau_e$) and/or a M/G torque request ($\tau_m$), as shown in FIG. 1. The net transmission input torque ($\tau_i$) is the net electric motor torque and engine torque ($\tau_i=\tau_m+\tau_e$), assuming that the disconnect and launch clutches 18, 22 are locked.

In alternative embodiments, the clutch 22 may be replaced with a torque converter including a lockup clutch or bypass clutch. The torque converter has torque multiplication effects when certain rotational speed differentials exist across the torque converter. During torque multiplication, the output torque of the torque converter is larger than the input torque due to torque multiplication across the torque converter. Torque multiplication exists for example, when the vehicle 10 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 22 are equal to one another, and the input and output rotational speeds for the device 22 are equal to one another. A locked clutch eliminates slipping and driveline inefficiency across the torque converter, for example, when the rotational speed ratio across the torque converter is greater than approximately 0.8, and may increase fuel efficiency for the vehicle 10.

Changing torque amounts and/or directions may cause disturbances or oscillation in driveline 26 associated with lash crossing. Backlash may occur in a vehicle driveline 26 whenever one of the wheel 16 torque and power plant torque provided by engine 12, and M/G 14 change direction relative to one another. This change in torque direction may occur with the vehicle 10 operating with both the disconnect clutch 18 and the launch clutch 22 (or lock out clutch for the torque converter) in a locked or engaged position. For example, when vehicle 10 is decelerating, the compression braking effect of the engine 12 provides negative torque to the transmission 24 which is then passed through the differential 28 and then to the wheels 16. At this point, the driveline 26 is wrapped or twisted in the negative direction. If the driver provides a power request, or tip-in, using the accelerator pedal, the engine 12 torque switches from negative to positive as it begins to supply torque to propel the vehicle 10 forward. The driveline 26 unwraps or untwists, as each driveline component changes from transmitting negative torque to transmitting positive torque. At some point during this transition, the driveline 26 passes through a relaxed state with zero torque applied to the wheels 16.

During this zero torque region, gear teeth in the transmission 24 and/or differential 28 may not be tightly coupled with mating gears or components and there may be some play or free rotation in the driveline 26. Play across multiple sets may be cumulative. As the engine 12 continues to provide positive torque, the driveline 26 will wrap in the positive direction. The gears may be quickly coupled resulting in a clunk. Also, the axle connecting the differential 28 to a wheel 16 may twist slightly as a result of higher torque on the differential 28 side of the axle compared to the wheel 16 side. The axle may act as a torsional spring to store this energy. As the vehicle 10 begins to accelerate, the wheel 16 torque catches up to the torque at the differential 28, and any energy stored in the axle is released quickly causing an oscillation in the opposite direction, or backlash. The result of this backlash crossing is a clunk or noise when the gear teeth hit together, and a reduction in wheel torque when the axle energy is expended. The clunks and oscillations may be noticed by a driver depending upon their severity. For a driveline with multiple gear meshes arranged in series, each gear mesh may have a lash zone. The lash in the driveline cascades or progresses through the gear meshes. After a gear mesh is engaged, the subsequent gear mesh crosses through a lash zone as the torque reversal passes through the component. Backlash may include main gear lash as well as any subsequent gears.

The scenario described above can also happen in the opposite direction. In this case, the driver would be providing a power request, such as a tip-in of the accelerator pedal for vehicle acceleration, and then suddenly removing the power request by releasing the accelerator pedal through a tip-out. The driveshaft 26 goes from being wrapped in the positive direction to being wrapped in the negative direction, with a similar torque dip or hole and clunk during the transition. The effect of the backlash crossing due to sudden acceleration is typically more noticeable than sudden deceleration.

Figure 2:
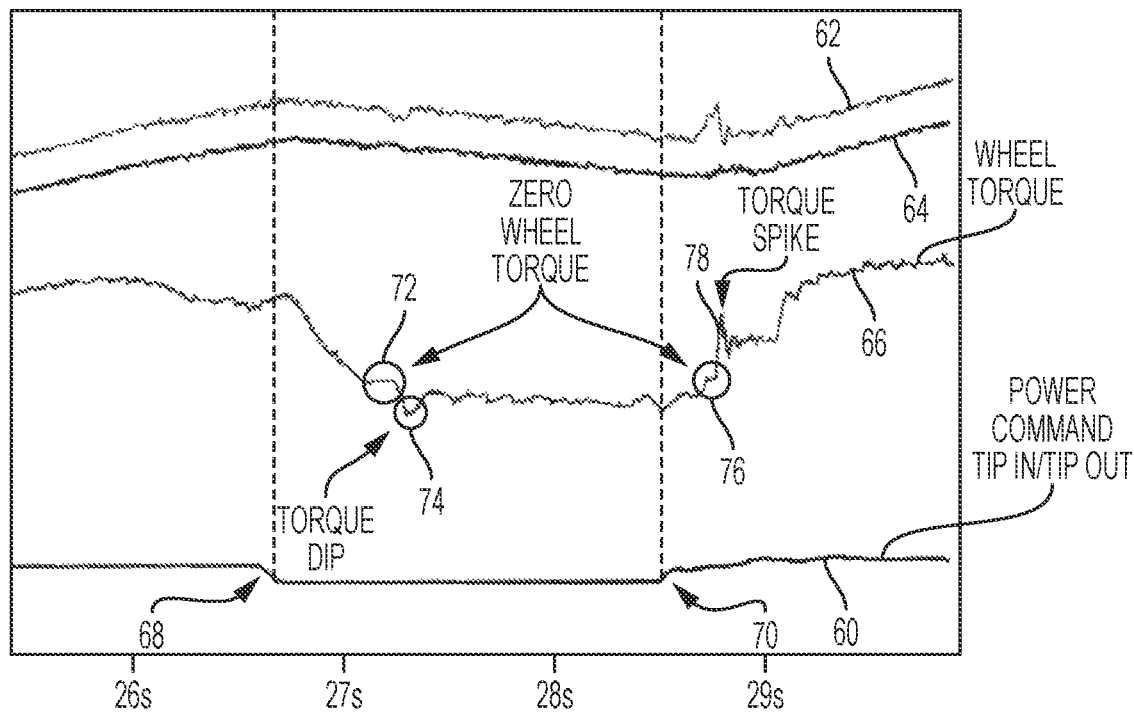
FIG. 2 illustrates wheel torque reversals and a corresponding lash zone in a representative hybrid vehicle.

Two backlash conditions for the vehicle 10 are shown graphically in FIG. 2 as an example. The accelerator pedal 60, transmission output speed 62, wheel speed 64, and wheel torque 66 are shown during a sudden deceleration at 68 and acceleration at 70. After the deceleration request at 68, transmission output speed 62 decreases faster than the wheel speed 64. This leads to the region 72 labeled "zero wheel torque", where the driveline 26 is in its relaxed state as wheel torque 66 makes a transition from positive to negative. Immediately following this transition, the wheel torque 66 decreases rapidly as the wheel speed 64 catches up to the transmission output speed 62, which leads into the region 74 labeled "torque dip". This torque dip 74 is essentially the backlash, and is caused by the energy stored in the half shaft being released and the play in the transmission 24 and other driveline components, in addition to the negative torque supplied by the transmission output. The effect of the backlash crossing 74 causes a resultant oscillation in the wheel torque.

During acceleration after a tip-in request at 70, a similar scenario occurs, only in reverse. The increase in transmission output speed 62 leads to the increase in wheel speed 64, which leads into the zero torque region 76 and then a rapid torque rise or "torque spike" at 78, causing a backlash crossing effect, or a noise and oscillation which may be felt by the driver.

The control system 42 is configured to detect, sense, and/or predict the lash region to reduce or mitigate the effect of the backlash crossing. The backlash in the vehicle 10 may be sensed by observing transmission input and output torque ratio, as described below. In one example, the control system 42 detects or senses a backlash condition for the vehicle as described in U.S. Pat. No. 9,037,329 B2 issued on May 19, 2015 and incorporated by reference in its entirety herein. In other embodiments, backlash may also be sensed by using speed sensors, or other techniques as are known in the art, such as those described in U.S. Pat. No. 7,223,203 B2 issued on May 29, 2007 and incorporated by reference in its entirety herein.

Figure 3:
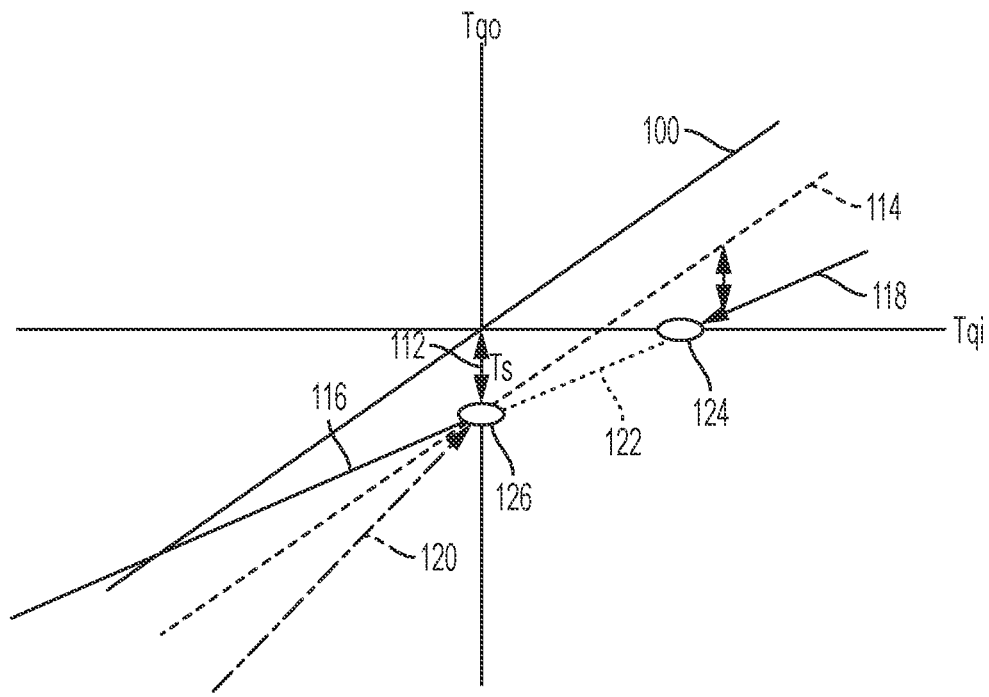
FIG. 3 illustrates a representative strategy for identifying or anticipating wheel torque reversal or a lash zone for use in engine and motor control according to embodiments of the disclosure.

FIG. 3 shows the ratio of input torque to output torque across the transmission 24. An ideal or perfect transmission 24 has a perfect torque ratio as shown by line 100 crossing through zero. However, there are proportional and non-proportional losses in a real transmission 24 that may be accounted for to improve accuracy. The losses have the effect of transposing or modifying the ideal torque ratio to an actual ratio of output torque to input torque. The actual torque ratio is the ideal torque ratio with the addition of losses. When input and output torques are both negative (generating), the transmission losses act to assist the vehicle in slowing down. When input and output torque are positive (propulsion), the losses impede propulsion effort. Line 118 represents the actual ratio during propulsion, taking losses into account. Line 120 represents the actual ratio when generating, taking losses into account. Line 122 is the range of ratios where the transmission 24 is carrying near-zero torque, and the potential for the effect of the lash zone to occur is the highest, and line 122 represents the lash region.

Region 124 represents the entry region for the lash zone from the propulsion, or positive input torque side. Region 126 represents the entry where entry region for lash from the generating, or negative input torque side. Line 122 between regions 124 and 126 is bounded by an input torque of zero (at 126) to an input torque of a positive scalar quantity (at 124), and by an output torque of a negative scalar value (at 126) to an output torque of zero (at 124). In other embodiments, other boundaries may be set to define the lash zone. By controlling input torque when the vehicle 10 is operating on line 122 as the vehicle accelerates or decelerates along it, the effects of a lash crossing event may be reduced or mitigated. The line 122 may be linear or nonlinear. For example, line 122 may be a step function with multiple steps cause by lash in each gear mesh in the driveline.

The input to output torque model for a gear ratio as illustrated in FIG. 3 may be determined as described below. During acceleration events, the driveline is in a drive configuration, such that torque from the engine 12 and/or the M/G 14 is transmitted to the wheels 16 through the transmission 24. During deceleration events, the driveline is in a driven configuration, such that torque from the wheels 16 is transmitted to the M/G 14 through the transmission 24. However, the amount of torque transmitted through the transmission 24 and driveline 26 is a function of the gear ratio and losses in the transmission 24 and driveline 26. FIG. 3 illustrates the torque, gear ratio and losses of the transmission 24 graphically. The gear ratio of the transmission 24 is equal to a ratio of the torque input ($\tau_{in}$) and torque output ($\tau_{out}$), where $\tau_{in}$ is the torque at the input shaft 46 to the transmission 24 and $\tau_{out}$ is the torque at the output shaft 48 of the transmission 24 and there are no losses in the system. The gear ratio may be based on a speed ratio, and be directly calculated from the numbers of teeth of the various gears that are engaged in the transmission 24. The gear ratio may also be considered an ideal torque ratio. For example, if the gear ratio is 4:1, for a +100 Nm input torque ($\tau_{in}$), the output torque ($\tau_{out}$) is 400 Nm. Therefore, the ideal torque ratio is represented by line 100 in FIG. 3 where the slope of the line is the ideal torque ratio, or the gear ratio.

A linear relationship may be used to relate torque input to torque output for a transmission, where the linear line can be described with the formula:

$$y = m*x + b$$

where y is the output torque ($\tau_{out}$) and x is the input torque ($\tau_{in}$). The slope, m, is the torque ratio output/input or the gear ratio, and b is the output torque when the input torque is zero. Ideally, or in a transmission 24 without losses, the slope would be the ideal torque ratio and the offset is zero, as shown by line 100. The slope with no losses is the ideal torque ratio or gear ratio ($TR_{ideal}$). Therefore, the formula for the line 100 is:

$$\tau_{out} = (\tau_{in}*TR_{ideal}) \qquad \text{Eq. (1)}$$

However, the transmission 24 is not perfectly efficient and has some losses. The losses in the transmission may be a function of friction, heat, spin losses, or many other factors. The losses in the transmission may be characterized as 'proportional losses' and 'non-proportional losses'. Proportional losses vary as a function of the current gear and speed, whereas non-proportional losses are independent of torque. The efficiency for a transmission 24 is usually measured across the transmission 24. The driveline 26 efficiency is typically measured with the launch clutch 22 locked or the bypass clutch for a torque converter locked, or may be modeled without a torque converter.

The intercept b is equal to the non-proportional loss, $T_s$, illustrated at 112 in FIG. 2 for each gear for a step gear transmission. Line 114 illustrates the ideal torque ratio or gear ratio when accounting for non-proportional losses, $T_s$, in the transmission 24. Non-proportional losses, $T_s$, may be in units of output torque. The non-proportional losses, or spin losses, in the driveline may be a function of driveline output speed, driveline oil temperature, and what gear the driveline is in. The driveline output speed may be a function of driveline input speed and a gear ratio of the driveline. Therefore, the formula for line 114 is:

$$\tau_{out} = (\tau_{in}*TR_{ideal}) - T_s \qquad \text{Eq. (2)}$$

Proportional transmission losses may also be accounted for in the model. The actual torque ratio of the transmission 24 of $\tau_{out}$ to $\tau_{in}$ can be measured empirically in different gears. The empirical modeling of the transmission 24, without the torque converter (locked, or not included), allows for representation of the "proportional to torque" losses separate from "non-proportional to torque" losses, which may be represented by using a linear relationship between output torque and input torque. Proportional losses may be a function of the driveline oil temperature, gear the driveline is in, and the input torque to the driveline. Proportional losses are represented by the slope of the output to input torque relationship for each gear. The slope including proportional losses is equal to the actual torque ratio across the transmission 24.

The ideal torque ratio, or gear ratio, and torque input-output relationship may then be used in combination with only a few measured points of the actual torque ratio input-output relationships to determine the difference between the slopes of the ideal torque ratio ($TR_{ideal}$) and the actual torque ratio ($TR_{actual}$). Proportional torque losses can be accounted for by subtracting the portion of $T_{in}$ that comes from the difference in the slopes between the ideal torque ratio and the actual torque ratio. Non-proportional losses are represented by $T_s$. The linear formula for the transmission when accounting for proportional and non-proportional losses, shown as line 116 in FIG. 2, may be represented according to:

$$\tau_{out} = (\tau_{in}*TR_{ideal}) - T_s - \tau_{in}*(TR_{ideal} - TR_{actual}) \qquad \text{Eq. (3A)}$$

Cancelling out the terms in the right hand side of the loss equation, the formula for line 116 in FIG. 3 may be simplified to:

$$\tau_{out} = (\tau_{in} * TR_{actual}) - T_s \qquad \text{Eq. (3B)}$$

For example, with a +100 Nm input torque, actual torque ratio of 4.0, ideal torque ratio of 4.1, and non-proportional loss of 5, the $\tau_{out}$ may be determined as follows. Note that the numbers are truncated for simplicity in the following example.

First, using Equation (3A), the output torque is calculated as:

$$\tau_{out} = (100*4.1) - 5 - (100*(4.1-4.0)) = 395 \text{ Nm}$$

Using Equation (3B), the output torque is calculated as:

$$\tau_{out} = (100*4.0) - 5 = 395 \text{ Nm}$$

Power can be determined multiplying torque by the speed of the shafts 46, 48, illustrated by the equation:

$$P = \tau * \omega$$

Using an input speed of 400 rad/sec, input and output power can be calculated according to:

$$P_{in} = 100*400 = 40,000 \text{ Watts}$$

$$P_{out} = 395*(400/4.1) = 38,536 \text{ Watts}$$

The difference between the power at the transmission input 46 and the transmission output 48 is the amount of power loss because of transmission inefficiencies and may be determined according to:

$$P_{in} - P_{out} = 1,464 \text{ Watts}$$

The loss formulas of Equations (3A) and (3B) are generally accurate in describing the transmission including losses in a traditional powertrain. The loss formulas in Equations (3A) and (3B) can also accurately describe the transmission including losses in a HEV powertrain when the vehicle 10 is motoring. However, an issue arises when the vehicle 10 is putting power into the transmission output 62 and extracting it from the transmission input 60, such as during regenerative powertrain braking in a HEV. In this situation, the torque values through the driveline 26 are negative, the transmission is in a driven configuration, and the loss formulas in Equation (3A) and (3B) apply differently.

The issue with the loss formulas in Equations (3A) and (3B) during regenerative powertrain braking is illustrated by another example as shown below. For example, for negative torques, where the input torque $\tau_{in}$ is −100 Nm input torque, the actual ratio is 4.0, the ideal ratio is 4.1, and non-proportional losses ($T_s$) is 5, $\tau_{out}$ is calculated as:

$$\tau_{out} = (-100*4.1) - 5 - (100*(4.1-4.0)) = -405 \text{ Nm using Equation (3A), or}$$

$$\tau_{out} = (-100*4.0) - 5 = -405 \text{ Nm,} \qquad \text{using Equation (3B).}$$

Using an input speed of 400 rad/sec, we can determine the power calculations as:

$$P_{in} = -100*400 = -40,000 \text{ Watts}$$

$$P_{out} = -405*(400/4.1) = -39,512 \text{ Watts}$$

$$P_{in} - P_{out} = P_{loss} = -488 \text{ Watts}$$

Using the standard formulas arrives at a negative loss calculation, which is not possible, as the power going into the output shaft 48 of the transmission 24 is smaller than the power coming out through the input shaft 46 of the transmission during. For this example, 40,000 Watts of regenerative energy are collected at the transmission input 46 when only 39,512 Watts of regenerative energy are going into the transmission output 48 from the wheels 16.

For modeling the torque relationship, two lines fit the data better than one line. The first line, illustrated as line 118 in FIG. 3, is for positive output torque $\tau_{out}$ and input torque $\tau_{in}$, such as when the vehicle 10 is motoring. The second line, illustrated as line 120 in FIG. 2, is for negative output torque and input torque, such as when the vehicle 10 is regenerative braking.

The non-proportional losses 112 are calculated to be the same during motoring and regeneration. Therefore, line 118 and line 120 both use the same offset term b for non-proportional torque loss $T_s$. However, during regeneration, the proportional losses are not correctly accounted for using the standard motoring equations.

The correct $\tau_{in}$ for a given $\tau_{out}$ value is correctly computed when the proportional torque losses are summed in the correct direction. The proportional loss term in Equation (3A), that is $\tau_{in} * (TR_{ideal} - TR_{actual})$, must be a positive value, regardless of whether the transmission is transmitting positive or negative torque. Because $\tau_{in}$ is negative during regeneration and the proportional loss expression in Equation (3A) must be positive, the ideal torque ratio needs to be less than actual torque ratio during regeneration in order to provide the correct calculation that more energy is going into the transmission output 48 than is received at the transmission input 46 during negative torque transfer.

For example, during a negative torque transmission, where the transmission input torque $\tau_{in}$ is −100 Nm, the actual torque ratio is 4.2, the ideal torque ratio, being less than the actual ratio, is 4.1, and non-proportional losses $T_s$ is 5, $\tau_{out}$ can be determined as:

$$\tau_{out} = (-100*4.1) - 5 - (-100*(4.1-4.2)) = -425 \text{ Nm using Equation (3A), or}$$

$$\tau_{out} = (-100*4.2) - 5 = -425 \text{ Nm,} \qquad \text{using Equation (3B).}$$

Note that the previous loss of −405 is approximately five percent in error.

Using an input speed of 400 rad/sec, the input power, output power, and power loss may be calculated according to:

$$P_{in} = -100*400 = -40,000 \text{ Watts}$$

$$P_{out} = -425*(400/4.1) = -41,463 \text{ Watts}$$

$$P_{in} - P_{out} = P_{loss} = 1463 \text{ Watts}$$

When the output torque and input torque are both positive the actual measured slope is less than the ideal torque ratio, as seen by line 118 compared to line 114. However, when the output torque and input torque are both negative, the actual measured slope, or $TR_{actual}$ is greater than the mechanical torque ratio, or $TR_{ideal}$, as seen by line 120 compared to line 114. The actual torque ratio for negative torque is measured to be 4.2. If the measured positive torque ratio of 4.0 is used for the negative torque situation, then Equation (3) will calculate that more energy is being collected at the transmission input 60 than is being input into the transmission output 62 during regeneration (as shown by line 116 compared to line 114).

To account for the difference between the actual torque ratio and the ideal torque ratio (or gear ratio), a proportional loss coefficient C1 is calculated for each gear using the following formula:

$$C1 = \tau_{in} * (TR_{ideal} - TR_{actual}) \qquad \text{Eq. (4)}$$

During propulsion/motoring, or positive torque through the transmission 24, the proportional loss coefficient C1 is included in Equation (3B) to derive the loss equation as follows:

$$\tau_{out} = (\tau_{in} * (TR_{actual} - C1)) - T_s \qquad \text{Eq. (5)}$$

Or alternatively, Equation (5) may be rearranged to determine a $\tau_{in}$ based on a desired torque output $\tau_{out}$ during motoring as:

$$\tau_{in} = (\tau_{out} + T_s)/(TR_{ideal} - C1) \qquad \text{Eq. (6)}$$

When the torque through the transmission 24 is negative, such as during a regenerative braking event, the actual torque ratio is greater than the ideal torque ratio (or gear ratio) by the same amount that the ideal torque ratio is greater than the actual torque ratio during motoring. Therefore, the sign of C1 changes during regenerative braking, but the absolute value of C1 remains the same. Therefore during negative torque transfer through the transmission, the $\tau_{in}$ based on a desired torque output $\tau_{out}$ is:

$$\tau_{in} = (\tau_{out} + T_s)/(TR_{ideal} + C1) \qquad \text{Eq. (7)}$$

The input to output torque relationship for the transmission 24 is therefore better characterized by two lines 118, 120 to differentiate between motoring and regeneration, or positive and negative torque. Line 120 in FIG. 3 illustrates the line accounting for proportional losses which add to regenerative braking. Line 120 may be characterized by rearranging Equation (7) as:

$$\tau_{out} = (\tau_{in} * (TR_{ideal} + C1)) - T_s \qquad \text{Eq. (8)}$$

The inclusion of a torque converter, pump losses, and dynamic inertia losses can be consistent across the transmission controls development process. For example, when the vehicle includes a torque converter, the torque input $\tau_{in}$ when the vehicle is motoring may be determined as:

$$\tau_{in} = ((\tau_{out} - T_s)/(TR_{ideal} - C1)) * (1/TR_{torque\_converter}) + \text{Loss}_{pump} + \text{Loss}_{dyn\_inertia} \qquad \text{Eq. (9)}$$

When the M/G 14 is generating or when the vehicle is regenerative braking such that the transmission output torque is negative, Equation (9) is modified so that the torque input $\tau_{in}$ may be determined from the following equation:

$$\tau_{in} = ((\tau_{out} - T_s)/(TR_{ideal} - C1)) * (1/TR_{torque\_converter}) \text{Loss}_{pump} + \text{Loss}_{dyn\_inertia} \qquad \text{Eq. (10)}$$

The torque converter may be connected between the M/G 14 and the transmission 24. The torque converter may also be included in the transmission 24. When the torque converter is locked via locking the bypass clutch, the torque ratio of the torque converter is 1:1.

The control system 42 is configured to determine a lash zone for the vehicle 10 based on the gear of the transmission, and to use the determined lash zone during vehicle operation to predict or detect an impending lash zone, which may in turn be used in a control strategy to mitigate the effect of the driveline lash crossing by controlling an adjustable gain of an active motor damping system as described in greater detail below.

Figure 4:
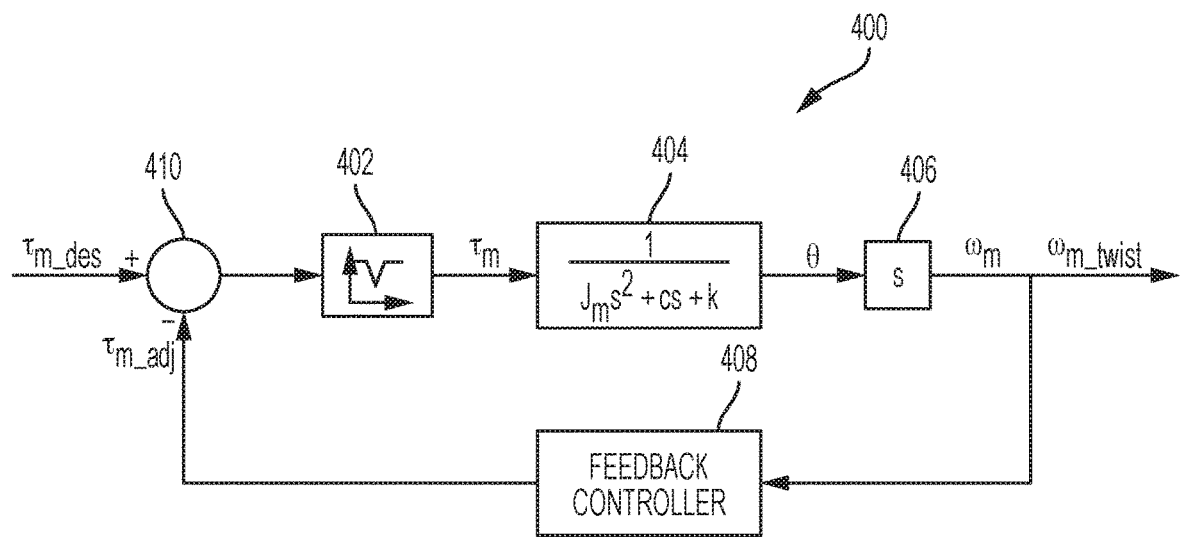
FIGS. 4 and 5 illustrate an active motor damping control system to damp driveline oscillations using an adjustable gain during control of the engine and motor according to embodiments of the disclosure.

Active motor damping (AMD) may be used to control driveline oscillation through lash zone crossings or wheel torque reversals. FIG. 4 illustrates a control system block diagram according to one embodiment of a damping control that may incorporate one or more adjustable gains to adjust the motor torque and reduce powertrain oscillations during lash zone crossings. The control system 400 may include a filter 402 (shown here in a forward loop) that removes frequency content and limits the damping function to within a predefined frequency range, the filter effectively functioning as a band pass filter. The predefined frequency range may be selected to include any powertrain torque variation scenario that has been identified to excite powertrain resonance resulting in unsmooth vehicle behavior. As such, the selected frequency range may vary by vehicle configuration. Filter 402 may be implemented by a narrow band notch filter that limits the damping function to a narrow frequency range, such as 5 Hz to 7 Hz, for example. The frequency ranges may vary however, and could include frequencies between 1 Hz and 100 Hz depending on the particular application and implementation. Filter 402 may also be adjusted or varied based on selected gears and gear ratios for the gearbox 24 to accommodate variations in resonant frequency associated with a currently selected gear and associated gear ratio.

A simplified model of the mechanical system dynamics of M/G 14 may be represented by a transfer function within the control 400 as generally represented at block 404 such as:

$$P(s) = \frac{1}{J_m s^2 + cs + k}$$

where $J_m$ is the inertia of the M/G 14, c is a damping constant of the mechanical system, and k is a spring constant of the mechanical system. Transfer function 404 may be used to determine an angular position θ of the M/G 14 corresponding to an input motor torque command $-\tau_m$. The angular position θ of the M/G 14 is input to a derivative block 406, the derivative having an output $\omega_m$, that represents the motor speed of the M/G 14 (the motor speed being an angular motor speed). Although the motor speed $\omega_m$ is shown as an output of the derivative block 406, this is merely a representation of the mechanical system. The motor speed $\omega_m$ is typically a measured value of the rotation of the motor shaft determined by a corresponding sensor 44 and may also be referred to as the measured motor speed $\omega_m$.

Figure 5:
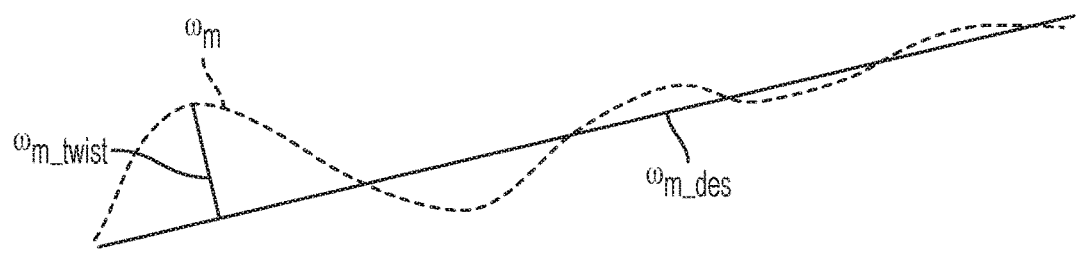

Referring to FIG. 5, the measured motor speed $\omega_m$ is shown illustrating the oscillations that occur within the motor speed $\omega_m$ of the M/G 14. Also shown is a desired motor speed $\omega_{m\_des}$ which is calculated by generating a smooth line that approximates the measured motor speed $\omega_m$. The desired motor speed $\omega_{m\_des}$ may be constructed using numerical analysis curve fitting techniques such as interpolation or smoothing. Once the desired motor speed $\omega_{m\_des}$ is calculated, a twist speed $\omega_{m\_twist}$ is calculated, which is the difference between the measured motor speed $\omega_m$ and the desired motor speed $\omega_{m\_des}$.

Referring again to FIG. 4, once the twist speed $\omega_{m\_twist}$ has been calculated, it is used as an input in a feedback loop. The feedback loop may include a feedback controller 408 which may be a proportional-derivative (PD) controller represented by the following transfer function:

$$H(s) = k_{md} \frac{s}{s+p} + k_{mp}$$

where $k_{md}$ is a derivative term relative to the twist speed, $\omega_{m\_twist}$, $$\frac{s}{s+p}$$

is a lead filter, and $k_{mp}$ is a proportional term based on the twist speed $\omega_{m\_twist}$. The derivative term k and the proportional term $k_{mp}$ may either be constant values or may be outputs from one or more tables stored in the TCU 36 or VSC 40, for example, where the input to the table(s) is the twist speed $\omega_{m\_twist}$. The output of the feedback controller 408 is a motor torque adjustment $\tau_{m\_adj}$. The motor torque adjustment $\tau_{m\_adj}$ is subtracted from the desired motor torque $\tau_{m\_des}$ at 410 resulting in a motor torque command $\tau_m$. The desired motor torque $\tau_{m\_des}$ will be the amount of torque provided by the M/G 14 when it is operating as a generator in hybrid mode, or in electric only mode. The motor torque command $\tau_m$ is also used as an input to the transfer function 404 after passing through the filter 402.

Alternatively, $k_{md}$ may be a derivative term based on the motor speed $\omega_m$, $k_{mp}$ may be a proportional term based on the motor speed $\omega_m$, and the derivative term $k_{md}$ and the proportional term $k_{mp}$ may either be constant values or may be outputs from tables stored in the TCU 36 or VSC 40, where the input to the table(s) is the motor speed $\omega_m$.

The feedback controller 408 is not limited to a PD controller, but may include other types of controllers such as PI (proportional-integral) controllers, or PID (proportional-integral-derivative) controllers. Similarly, other control system configurations may be used with various feedforward and/or feedback terms.

As described below with reference to FIG. 6, the control system 400 may include one or more adjustable gains that change in response to operation through a lash zone. The control algorithm coordinates control of the engine and motor to mitigate driveline backlash during a torque direction change while also damping oscillation caused by rapid torque changes in the driveline. The control system 400 will continue to operate to provide active motor damping and reduce driveline oscillations for either a predetermined elapsed time or until the speed error is reduced below a predetermined threshold. The speed error is the difference between the measured motor speed $\omega_m$ and the desired motor speed $\omega_{m\_des}$ (the twist speed $\omega_{m\_twist}$) and may be represented by the following equations:

$$e = \omega_m - \omega_{m\_des} \text{ or } e = \omega_{m\_twist}$$

Figure 6:
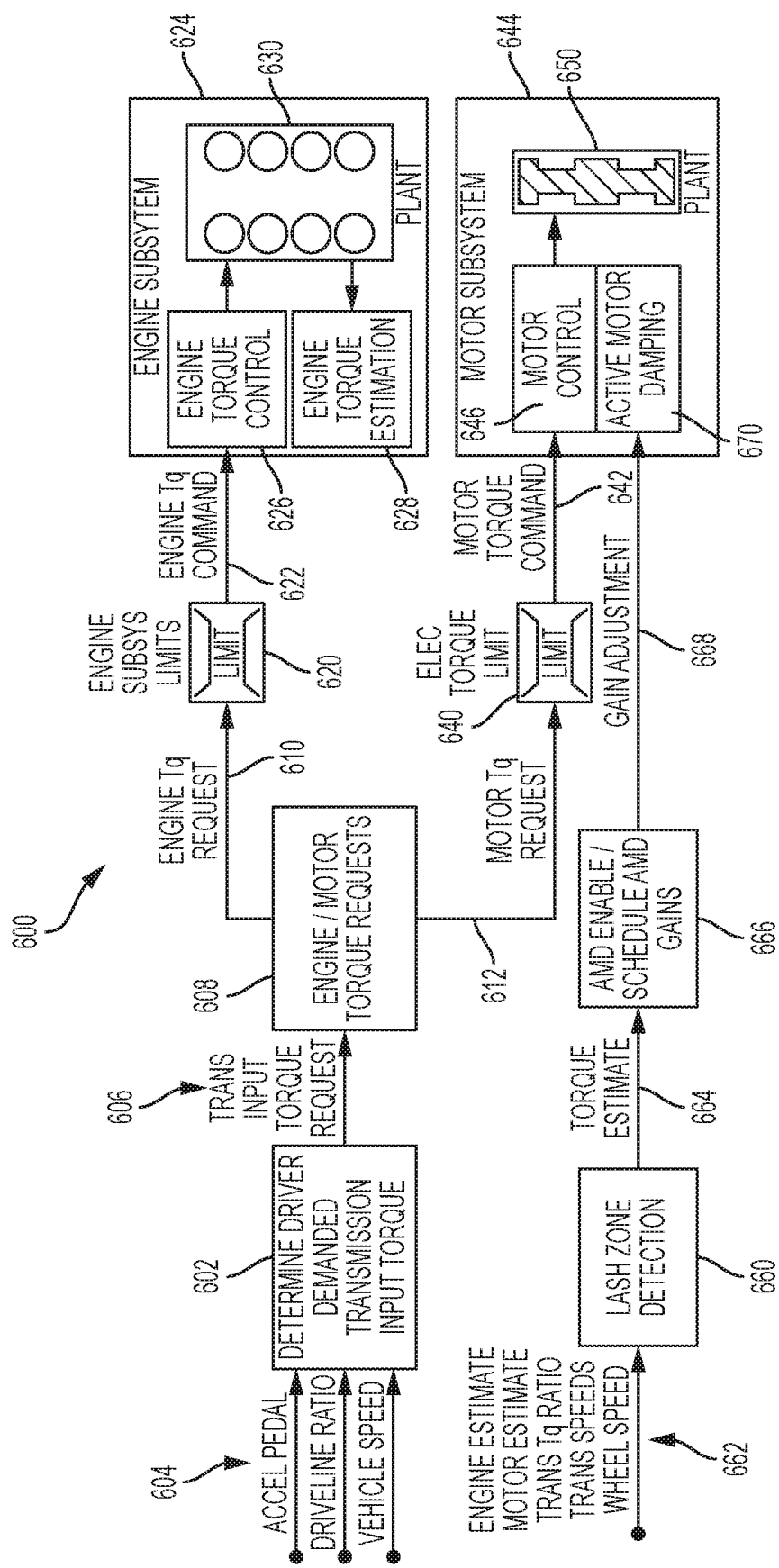
FIG. 6 is a block diagram illustrating operation of a representative control architecture of an engine and motor control system for a hybrid vehicle according to embodiments of the disclosure.

FIG. 6 is a block diagram illustrating a control architecture for engine and motor control during wheel torque reversals according to at least one embodiment of the disclosure. Control 600 may be implemented by one or more control algorithms executed by a programmed microprocessor, such as TCU 36, ECU 38 and/or VSC 40, for example. Block 602 represents determination of driver demanded transmission input torque based on inputs 604, which include accelerator pedal position, driveline ratio, and vehicle speed in this embodiment. Block 602 determines a transmission input torque request as represented at 606 that is provided to block 608. Block 608 determines an engine torque request 610 and a motor torque request 612 to satisfy the transmission input torque request 606 based on current operating parameters, such as current operating mode, battery state of charge (SOC), vehicle speed, transmission gear selection, etc. The engine torque request 610 is subject to engine subsystem limits as represented at 620 to provide an engine torque command as represented at 622 to the engine subsystem 624. The engine subsystem control provides engine torque control 626 of the engine or plant 630 as well as an engine output torque estimate as represented at 628.

In a similar manner, motor torque request 612 is limited by upper and/or lower motor torque limits at 640 to generate a motor torque command 642 for the motor subsystem 644. Motor control 646 controls the motor or plant 650 to provide motor torque to satisfy the motor torque command 642.

Figure 8:
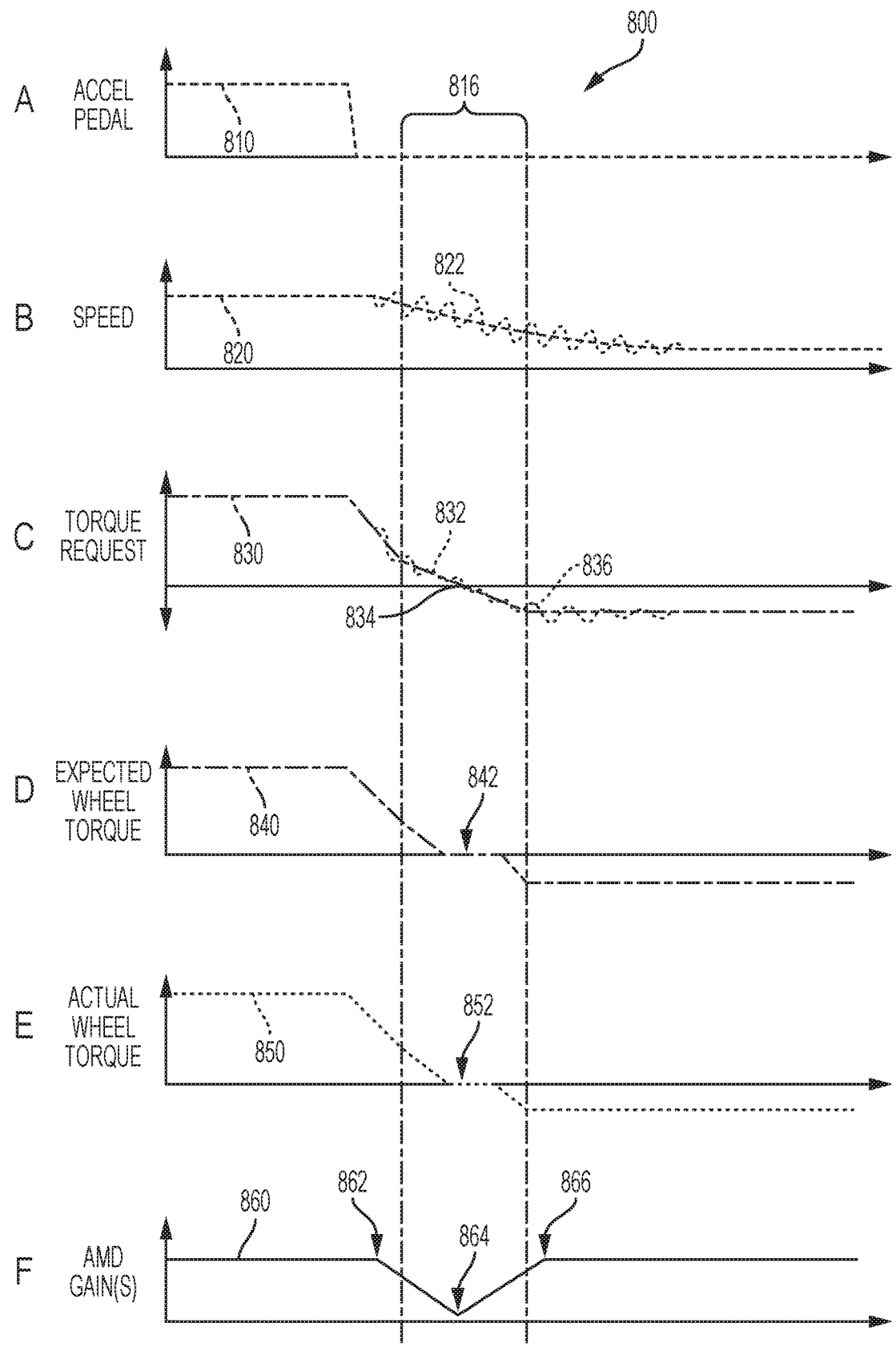
FIG. 8 illustrates operation of a hybrid vehicle having engine and motor control during wheel torque reversal according to embodiments of the disclosure.

Lash zone or wheel torque reversal detection is performed as represented at 660 based on various vehicle inputs 662 that may include an engine torque estimate, motor torque estimate, transmission torque ratio, transmission input and output speeds, and wheel speed, for example. The resulting torque estimate 664 is used to predict a wheel torque reversal or lash zone crossing so that active motor damping (AMD) is enabled with one or more AMD gains scheduled as represented by block 666. The AMD gain(s) may be scheduled using one or more lookup tables or otherwise calculated based on one or more equations. As illustrated in FIG. 8, in one embodiment the AMD gain(s) used in the oscillation control algorithm performed by the AMD controller 670 are adjusted at block 666 to provide a gain adjustment 668 that reduces the gain(s) to near zero when the driveline torque is near zero when transitioning from propulsive force to regenerative force, or vice versa. The gain(s) are then increased in a manner to smoothly phase in oscillation control by the AMD controller 670 after the torque reversal occurs.

Figure 7:
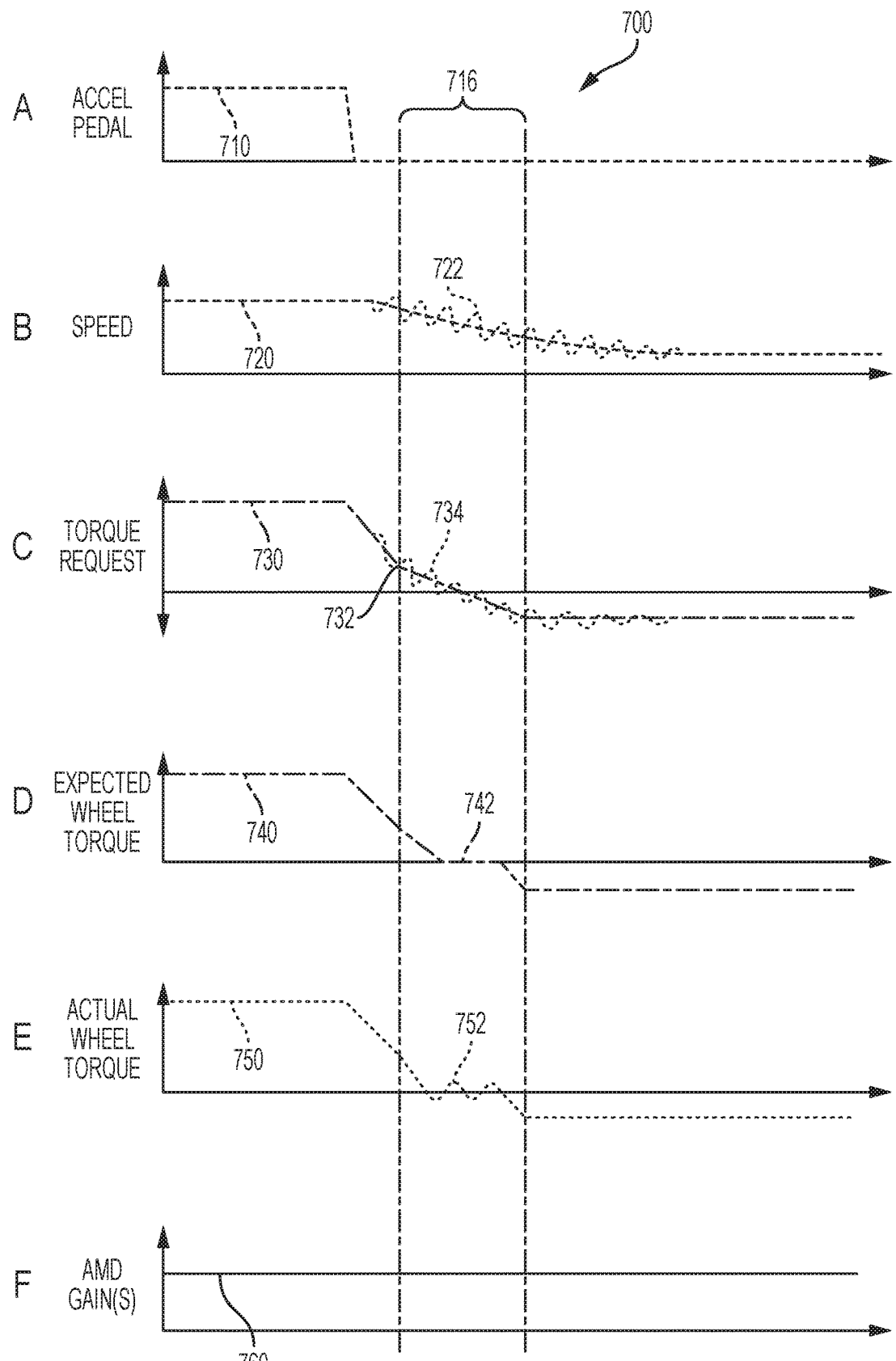
FIG. 7 illustrates operation of a prior art hybrid vehicle without engine and motor control during wheel torque reversal as provided by embodiments of the disclosure.

FIG. 7 illustrates representative operation of a prior art hybrid vehicle during a wheel torque reversal associated with an accelerator pedal tip-out. The control system represented by graphs 700 does not include one or more adjustable gains in the AMD controller. Plot A represents accelerator pedal position 710 before, during, and after crossing lash zone 716. As illustrated, the tip-out or decrease of accelerator pedal position 710 will triggers the wheel torque reversal within the lash zone 716 in this example. Plot B represents the transmission input speed request 720 and illustrates oscillation 722 at the driveline resonance. The transmission input torque request 730 is shown in plot C. The transmission input torque request rate changes to slow the rate for a smooth crossing through the zero torque point at the beginning of the lash zone 716 as generally indicated at 732. Motor torque is applied opposite of the speed change by the active motor damping control as represented at 734 to damp the driveline resonance. The expected wheel torque is illustrated in plot D by line 740 with the expected zero torque region indicated at 742 wherein the meshing gear teeth are floating. The actual wheel torque is shown in plot E as represented by line 750. The AMD control using a constant gain as shown in plot F by line 760 causes the wheel torque to cross zero torque multiple times as indicated at 752 resulting in driveline clunk.

FIG. 8 illustrates representative operation of a hybrid vehicle during a wheel torque reversal associated with an accelerator pedal tip-out using AMD with adjustable gain(s) according to one embodiment of the disclosure. The control system represented by plots or graphs 800 includes an AMD system with one or more adjustable gains. Plot A illustrates accelerator pedal position represented by line 810 which results in a wheel torque reversal within lash zone 816. Plot B illustrates a transmission input speed request as represented by line 820 and associated oscillation at the driveline resonance as represented by line 822. Plot C illustrates a transmission input torque request represented by line 830. AMD torque used to damp driveline oscillations is represented by line 832 and is reduced to near zero by adjusting one or more AMD gains to near zero in the zero torque region indicated at 834. The gain(s) are then increased to provide a smooth transition of AMD torque as indicated at 836. Plot D illustrates expected wheel torque 840 and the expected zero torque region 842 where meshing gear teeth are floating. Plot E illustrates actual wheel torque 850. The reduced AMD torque near the zero torque region 852 allows a smooth torque transition.

Plot F illustrates a representative AMD control system gain 860 that is reduced or phased out as the transmission input torque approaches the lash zone 816 as represented at 862. One or more gains are reduced to near zero as indicated at 864 and then increased or phased in as indicated at 866. Although illustrated as a piecewise linear function in this example, the one or more gains may be reduced in a different manner depending on the particular application. Similarly, the reduction or phase out of the gain may be performed at a rate different than the phase in or increasing of the gain.

Figure 9:
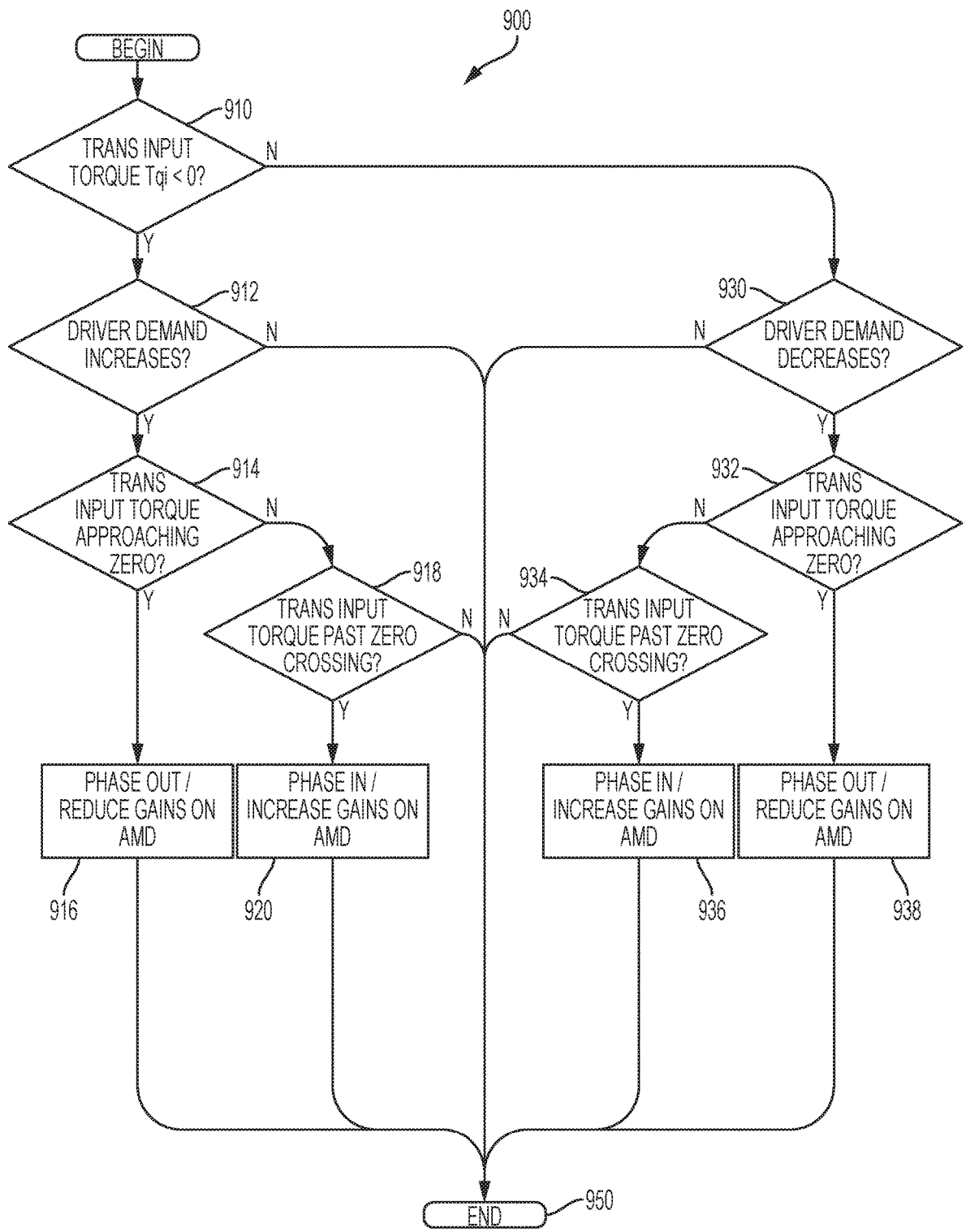
FIG. 9 illustrates operation of a system or method for engine and motor control during wheel torque reversal according to embodiments of the disclosure.

FIG. 9 is a simplified flowchart illustrating operation of a system or method for engine and motor control during wheel torque reversal of a representative embodiment. The diagrams of FIG. 9 provides a representative control strategy or algorithm for a hybrid vehicle having an internal combustion engine and one or more electric machines according to representative embodiments of the present disclosure. The control strategy and/or logic illustrated is generally stored as instructions or code implemented by software and/or hardware in one or more vehicle controllers, such as TCU36, ECU 38, and VSC 40 and/or related vehicle controllers. The instructions or code may be processed using any of a number of known strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. Of course, the control logic or algorithm illustrated may be implemented in software, hardware, or a combination of software and hardware in one or more controllers depending upon the particular application. When implemented in software, the control logic or instructions may be stored in one or more non-transitory computer readable storage media having stored data representing code or instructions executed by a computer to control the vehicle. The computer readable storage media may include one or more of a number of known physical devices which utilize electric, magnetic, optical, and/or hybrid storage to store executable instructions and associated calibration information, operating variables, and the like.

Control system or method 900 determines whether transmission input torque is less than zero at 910 and if so, whether the driver demand increases at 912. Block 914 then determines whether the transmission input torque is approaching zero. If so, one or more gains of the active motor damping control are reduced or phased out as represented at 916. If transmission input torque is not approaching zero at 914, the block 918 determines whether transmission input torque is past the zero crossing and if so, block 920 increases or phases in one or more gains of the active motor damping control.

If the transmission input torque is greater than or equal to zero as indicated at 910, block 930 determines whether the driver demand decreases. Block 932 then determines if the transmission input torque is approaching zero. If the transmission input torque is not approaching zero at 932, then block 934 determines if the transmission input torque is past the zero crossing. If yes, block 936 phases in or increases at least one gain for the active motor damping control. If the transmission input torque is approaching zero at 932, then at least one active motor damping gain is reduced or phased out as indicated at 938. If the result of any of blocks 912, 918, 930, or 934 is no, then the process ends and repeats as indicated at 950. Similarly, the process ends and repeats after the one or more gains for the active motor damping control are adjusted as indicated at blocks 916, 920, 936, and 938.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. Embodiments described as less desirable than other embodiments or prior implementations with respected one or more characteristics are not necessarily outside the scope of the disclosure and may be desirable for particular applications.

What is claimed is:

1. A vehicle comprising:
an engine selectively coupled by an upstream clutch to an electric machine, which is selectively coupled by a downstream clutch to a step-ratio transmission; and
at least one controller programmed to control the engine and the electric machine in response to entering a lash zone in anticipation of a wheel torque reversal to adjust a gain applied to an active motor damping torque controller to reduce driveline oscillations and backlash, wherein the at least one controller reduces the gain prior to a zero torque point where meshing gear teeth of driveline components are floating.

2. The vehicle of claim 1 wherein the gain is linearly reduced.

3. The vehicle of claim 1 wherein the at least one controller increases the gain after a zero torque point where meshing gear teeth of driveline components are floating.

4. The vehicle of claim 3 wherein the gain is linearly increased.

5. The vehicle of claim 1 wherein the at least one controller is programmed to adjust the gain applied to an active motor damping torque controller that controls electric machine torque to counteract powertrain speed oscillations and drive a measured electric machine speed toward a desired electric machine speed using a damping function based on a difference between the measured and desired electric machine speeds.

6. The vehicle of claim 1 wherein the at least one controller adjusts the gain based on an engine torque estimate, an electric machine torque estimate, and a torque ratio of the step-ratio transmission.

7. The vehicle of claim 6 wherein the at least one controller adjusts the gain further based on input and output speeds of the step-ratio transmission and vehicle wheel speed.

8. The vehicle of claim 1 wherein the at least one controller is further programmed to adjust the gain so that no torque is requested from the electric machine when the driveline torque passes through a zero torque point where meshing gear teeth of driveline components are floating.

9. The vehicle of claim 1 wherein the at least one controller is programmed to identify the lash zone based on a change in accelerator pedal position and a torque ratio of the step-ratio transmission.

10. The vehicle of claim 1 wherein the downstream clutch is disposed within a torque converter of the step-ratio transmission.

11. A method for controlling a vehicle having an engine, an electric machine, and a transmission, comprising:
in response to: a change in driver demanded torque; and input torque to the transmission approaching zero, reducing at least one gain of an electric machine torque feedback controller to control torque of the electric machine through a lash region associated with a driveline or wheel torque reversal.

12. The method of claim 11 wherein adjusting at least one gain comprises reducing the at least one gain.

13. The method of claim 11 wherein reducing at least one gain further comprises adjusting the at least one gain in response to a torque ratio of the transmission.

14. The method of claim 11 further comprising, in response to the input torque to the transmission passing a zero torque crossing, increasing the at least one gain.

15. The method of claim 11 wherein reducing at least one gain further comprises reducing the at least one gain to zero.

16. A non-transitory computer readable storage medium having stored instructions executable by a vehicle controller to control a vehicle having an engine, a traction motor, and a transmission, comprising instructions for:
adjusting a gain of a traction motor feedback controller in response to a change in driver demanded torque anticipated to result in a driveline torque reversal or a wheel torque reversal; and
reducing the gain in response to an increase in driver demanded torque and transmission input torque approaching zero.

17. The non-transitory computer readable storage medium of claim 16 further comprising instructions that increase the gain in response to the transmission input torque passing through zero.

18. The non-transitory computer readable storage medium of claim 16 further comprising instructions for reducing the gain to zero as the transmission input torque approaches zero.

* * * * *